Figure 1:
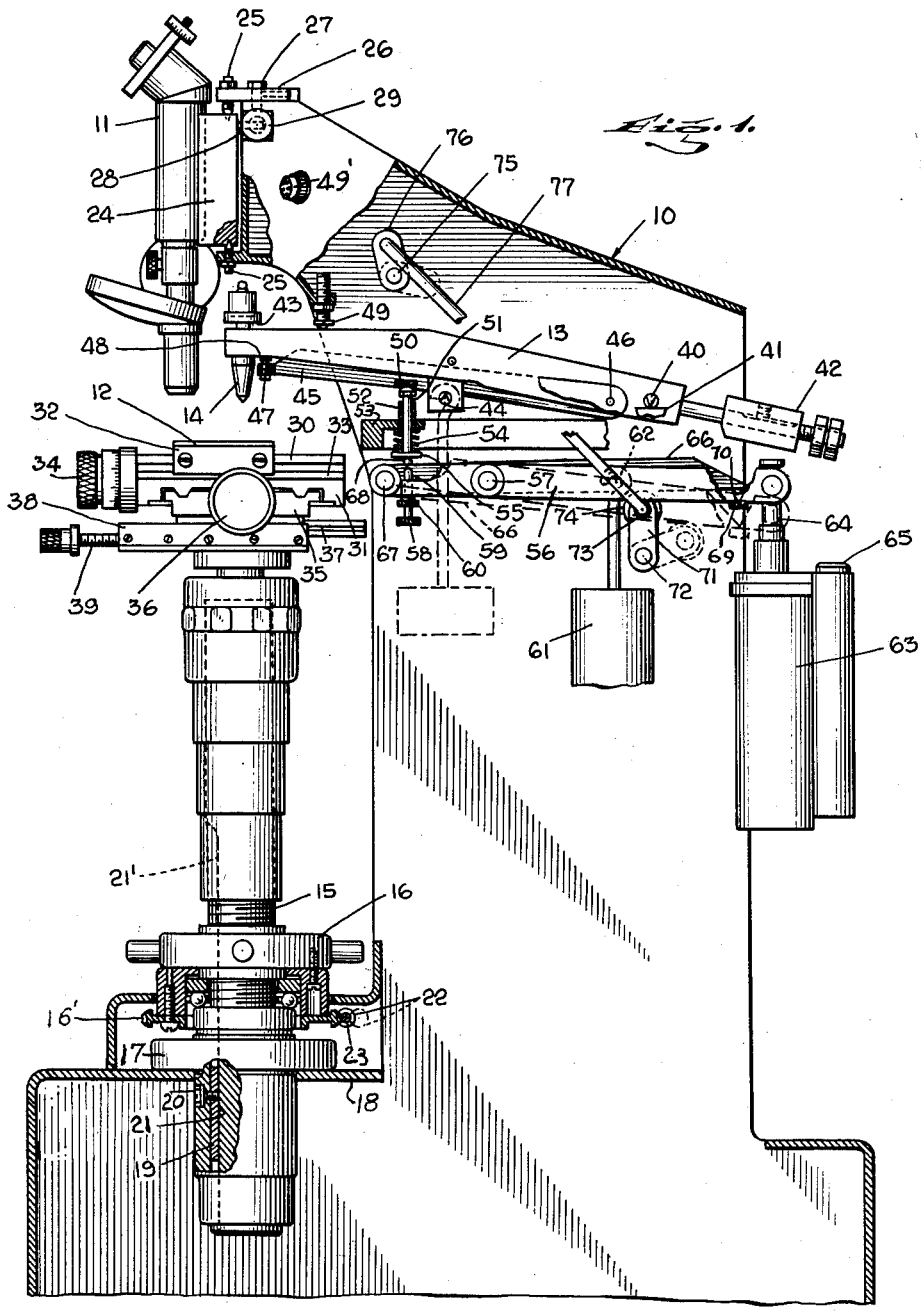

Nov. 8, 1955  C. W. SMITH  2,722,831
HARDNESS TESTERS
Filed July 29, 1950

CHARLES W. SMITH
INVENTOR.

BY John H. Hilliard
ATTORNEY

United States Patent Office 2,722,831
Patented Nov. 8, 1955

2,722,831

HARDNESS TESTERS

Charles W. Smith, Stratford, Conn., assignor, by mesne assignments, to American Chain and Cable Company, Inc., a corporation of New York Application July 29, 1950, Serial No. 176,685

3 Claims. (Cl. 73—81)

This invention relates to hardness testers of the type in which an indenter of known shape and size is pressed into a specimen with a known force, and the hardness of the specimen deduced from the size of the resulting indentation.

In U. S. Patent No. 2,091,995 there is described an indenter which is in the form of a pyramid with two greatly elongated edges, which produces an impression, as viewed with the microscope, of a rhombus with one diagonal much longer than the other. The length of the longer diagonal of this rhombus is one measurement made in evaluating the hardness of the specimen.

This type of indenter can be utilized to make comparatively minute impressions, for instance, in individual crystals of the specimen tested. For such small impressions a light load on the indenter is required and the field of usefulness of the indenter extends down to loads as small as a gram. At the same time, the indenter is capable of use under loads of several kilograms, and it is desirable that a machine for this or similar indenters be capable of operating between these ranges.

When the indenter is utilized under light loads, it is essential that there be no vibration during the time the indenter is in contact with the specimen, as such vibration results in blurring and enlarging the resultant indentation, rendering readings inaccurate. Also, at light loads, impact effects due to variation in rate of application of the load become important, as the mass of the moving parts of the instrument is large compared to the total desired load. It is also important to be able to vary the speed of approach of the indenter to the specimen, and also to be able to vary the time interval of full load application independently of the speed of approach so that various recovery and flow characteristics of the material under test can be studied.

In a device utilizing a microscope for location of the particular area to be tested, and for examination of the resulting indentation, the microscope is focussed on the specimen, and the specimen then moved under the indenter and indented. As the indentation entails vertical movement of the specimen in some machines, reexamination requires refocussing. In machines employing beams to support the weight, it is necessary that the surface of the specimen be at an exactly determined height when the indentation is started, and, unless the specimens are all the same thickness, each initial examination and re-examination requires a double focussing operation.

With the above considerations in mind, it is a primary object of the present invention to provide a hardness tester which is free from vibration during contact of the specimen and the indenter.

It is a further object of the present invention to provide a hardness tester in which the act of focussing the microscope positions the specimen in the proper plane for indentation.

Figure 2:
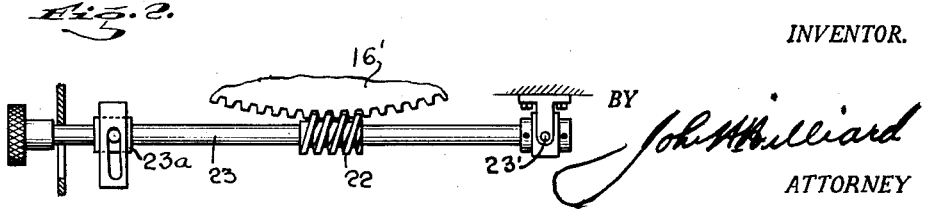

Referring now to the drawings:

Fig. 1 is a side view, partly in section, showing one preferred form of the present invention; and Fig. 2 is a fragmentary plan, partly in section, of part of the mechanism shown in Fig. 1.

In general, the device includes a main frame 10, a microscope 11 which in use is rigidly attached to the frame, a specimen support 12 movable vertically by means of a screw mechanism, and a beam 13, which carries an indenter 14 and is permitted to descend upon a specimen under definite load and at a definite speed. After the indenter has rested on the specimen for a predetermined interval, the mechanism raises the beam 13 and the penetrator 14 clear of the specimen, which may be then examined under the microscope.

The elevating mechanism, for raising the specimen to the correct height includes a screw 15 which carries the support 12. The screw passes through an internally threaded nut 16, provided with handles to permit it to be rotated. A thrust bearing, including a series of balls running on hardened races, supports the nut 16, the lower race being supported by the bushing 17. The bushing 17 is in turn supported by the base 18, forming part of the main frame 10. The bushing 17 carries a key 19, secured to its interior, as by a screw 20, received in a keyway 21, cut in the screw 15. This key serves to prevent rotation of the screw as the nut 16 is rotated.

As was stated above, it is an object of this invention to utilize the vertical movement of the support 12 to bring the specimen into focus, which also brings it to the correct height for the operation of the indenter. To achieve the necessary slow adjustment, a worm wheel 16' is secured to the nut 16 to rotate therewith. As best shown in Fig. 2, this worm wheel is engaged by a worm 22, mounted on a shaft 23 which carries a knob for rotation by the fingers of the operator. For disengagement of the worm and wheel, the worm and shaft are moved to the position shown in dotted lines in Fig. 1, by any suitable mechanism. The preferred mechanism is simply a pivot 23' for the bearing supporting one end of the shaft 23, and a sliding support 23a for the bearing adjacent the actuating knob, so that by simply grasping the knob and pulling it sideways, the shaft and worm can be swung in a horizontal plane to bring the worm into or out of engagement with the wheel.

The microscope tube is secured to a support 24 which is held to the frame by means of cone-pointed set screws 25, engaging conical seats at each end of the support 24, so that the microscope can be adjusted vertically. The upper of these set screws is threaded into a lug 26 which is capable of slight rotation in a horizontal plane to tip the microscope slightly. The lug 26 is also capable of slight movement to the left and right as seen in the figure, to tip the microscope about an axis perpendicular to that of the first mentioned tipping. It is held in adjusted position by the bolt 27. The purpose of these adjustments is to bring the optical axis of the microscope to a line normal with the surface of the specimen support, so that the entire field of view will be equally well in focus, which is done upon setting up the instrument. The microscope support 24 can rotate about the conical ends of the set screws 25, which is a useful movement permitting the microscope to sweep the specimen. A rod 28 secured to the microscope support is engaged on the side toward the reader by the end of a knurled screw 29, and on the side away from the reader by a spring pressed plunger, so that rotation of the screw 29 causes the support to pivot around the axes of the conical ends of the set screws 25.

In order to transfer the specimen from the field of view of the microscope to a position for indentation the specimen support 12 is arranged for sliding movement. In addition, to enable the operator to accurately locate the point of impression, the support is provided with micrometer movements in a horizontal plane at right angles to each other.

The table 12, upon which the specimen is placed for examination, is slidably mounted on a pair of inverted V's forming ways, one of which, 30, is visible in the figure, which are formed in the top of a block 31. The table 12 is held in place by a pair of plates, as 32, whose bottom edges are bent inward to engage slots 33 cut in the block 31. Motion of the table 12 is controlled by a screw rotated by the knob 34 which may bear suitable indicia for measurement of the distance traversed.

The block 31 is provided on its underside with V's which engage ways cut in the lower block 35, for motion normal to the plane of the paper in the figure. The motion of the upper block relative to the lower block is also regulated by a screw, actuated by the knob 36. Secured to the underside of the block 35 is a slide 37 having V's in its bottom which slide on corresponding ways on the base member 38. The motion of the entire table upon the base member 38 is produced by simply grasping the table and pushing in the direction desired. Internal stops limit the movement to the right of the figure, and a collar on screw 39 limits the movement to the left.

The structure so far described is for the purpose of positioning the specimen under the microscope, raising it to the correct height by use of the nut 16 directly and by turning the worm gear shaft 23. Upon proper focussing, the specimen is in a fixed position relative to the microscope, and, as the microscope is fixed, in a fixed position relative to the rest of the instrument. In this connection, it is pointed out that when using multiple objectives of different magnification, parfocal objectives are used, in order that the position of the focal plane be the same no matter what the magnification may be. The specimen can then be moved under the indenter and the indenter lowered into contact with the specimen.

The beam 13, as was before mentioned, carries the indenter 14. This structure 13 carries a knife edge 40, which rests on a plane 41, the plane 41 being supported by the main frame 10. Suitable balancing counterweights 42 are provided to balance the penetrator and beam. The load to be applied may be placed on the platform 43 as shown. In the case of large weights within the range of the instrument, they are more conveniently suspended from a knife edge 44, as shown in dot and dash lines in the drawing. Small weights are preferably placed on the platform 43, as otherwise the construction of the weight, with its necessary hook to engage the knife edge, is flimsy and easily distorted in the case of very small weights.

In order to raise and lower the indenter end of the beam 13, a beam yoke 45 is provided. This yoke is U-shaped in plan, with a leg on each side of the beam. The yoke is pivoted to the main frame 10 along the axis of the pivot 46. A small conical or ball ended screw 47 on the beam yoke engages a similarly shaped seat 48 on the beam itself, thus assuring that the beam always takes the same position when lifted. In order to assure that the seat 48 and the end of the screw 47 are properly engaged when light loads are used on the beam, a plunger 49 is mounted on the main frame 10. This plunger is backed by an internal spring to yieldingly engage the beam 13 as the beam moves upwardly under influence of the screw pressing in the seat 47. Downward travel of the plunger 49 is limited so that it disengages the beam before the beam has moved sufficiently to cause the indenter to come in contact with the specimen. The downward movement of the plunger 49 is utilized to extinguish a pilot light at 49' to indicate that a cycle of testing is in progress. This is accomplished by a pair of internal contacts connected in the line of the lamp and opening when the plunger moves.

As the yoke 45 controls the position of the beam, means is provided to move the yoke in such a manner as to lower the indenter onto the specimen at a controlled speed, let it rest thereon for a predetermined time, and then raise it clear of the specimen. This is done in the present instance by the use of two levers, cooperating with each other and the yoke, and a driving weight to impart motion to the levers which will cause the beam to travel as described.

A cross plate 50 secured to the yoke is engaged by a lifting plunger 51, supported for vertical movement in a bushing 52, which is secured to the platform 53 forming part of the main frame 10. This plunger 51 is urged in a downward direction by a spring 54, and is provided with an enlarged head 55, which is engaged by elements of the levers to control its vertical movement.

A lever 56 is pivoted on a pin 57 secured to the main frame 10, and is provided with a thumbscrew 58, which projects from the upper surface of the lever and has a rounded upper end 59 for engaging the plunger head 55. A knurled nut 60 serves to lock the thumbscrew in adjusted position.

The lever 56 has a driving weight 61 hung from a pin 62 thereon, to cause it to move downwardly, and a dash pot 63 for controlling the downward movement. A piston rod 64 is pivoted to the end of the lever 56, and descends when the lever is released and permitted to drop thus forcing the internal piston of the dash pot downwardly. The rate of descent of the piston and piston rod is regulated by a needle valve having an adjusting knob 65.

A second lever 66 is pivoted to a pin 67 secured to the main frame 10, and carries a round pointed screw 68, in the figure immediately to the rear of and slightly above the rounded end 59 of thumbscrew 58. At its free end, lever 66 has a button 69 for engagement with a cross plate 70 attached to the lever 56.

In order to hold levers 56 and 66 in the position shown in the figure until a test is to be made, and to return them to that position after a test has been made, a crank 71, pivoted to the main frame 10 by a shaft 72, is provided with a pair of rollers. The smaller of this pair of rollers indicated by the numeral 73, engages the lever 56, while the larger roller 74 engages the lever 66.

At a convenient point exterior of the main frame there is provided a knob for rotating a shaft 75 to which is secured a crank 76. The crank 76 and crank 71 are connected together by means of a link 77 in such a manner that rotation of the crank 76 between the positions shown, in full and dotted lines, will result in rotation of crank 71.

With the above relationship of the parts, the operation of the mechanism, after a specimen is placed under the indenter, is as follows:

The operator initiates the test cycle, after placing a specimen on the support 12, focussing and then moving the support to position the specimen under the indenter, by turning the operating knob to move crank 76 to the dotted line position. The crank 71 follows this movement, and the machine then functions automatically. As the roller 73 moves to the dotted line position, the lever 66, otherwise unsupported, drops until the button 69 engages the cross plate 70 on lever 56. This movement of lever 66 lowers the element 68, which movement is followed by the plunger 51, and with the motion of the plunger 51, the yoke 45 also drops. Under the influence of the overbalancing weight on the platform 43 or the knife edge 44, the beam 13 moves to lower the indenter bearing arm. However, this motion is insufficient to bring the indenter into contact with the specimen.

Upon movement of the crank 71, as described above, the roller 73 leaves the bottom of the other lever 56, and that lever immediately begins to pivot under the influence of the weight 61, the rate of drop being controlled by the dash pot. As the lever 56 pivots, the lever 66 follows its motion, and the beam, supported through the plunger and yoke, follows the downward movement of the element 68. This motion downwards continues for an interval sufficient for any tremors imparted in the mechanism by the operator's hands to die down, before the indenter 14 engages the surface of the specimen.

After engagement of the specimen by the indenter, the continued downward movement of the element 68 and the plunger 51, followed by the yoke 45, leaves the beam arm supported entirely by the indenter resting on the specimen.

While this has been going on, the end 59 of screw 58 has been rising, as it is on the lever 56 at a point which rises during downward movement of the weight 61. Eventually the end 59 of the screw 58 will pass the element 68, and start the plunger 51 moving upwardly. This movement is followed by the yoke 45, and the cone pointed screw 47 of the yoke, after sufficient upward movement of the yoke 45, reengages the seat 48 on the beam. Continued upward movement lifts the indenter clear of the specimen, which may be examined, or moved to another position for a further test.

In the event that another indentation is desired before examination, it is not necessary to remove the specimen from under the indenter to return the mechanism to its initial position, shown in Fig. 1 in full lines. It is merely necessary to rotate the shaft 75, bringing the crank 76 to the full line position. When this is done, the roller 74 engages the lever 66, and lifts the button 69 from engagement with the cross plate 70 and raises element 68 relative to the screw end 59. Continued motion of the crank 71 counterclockwise as viewed in Fig. 1 causes a lowering of the screw end 59, as roller 73 engages and lifts the lever 56. However, because of the relative movement of the element 68 and screw end 59, the plunger 51 is transferred from screw end 59 to the element 68 before it has been lowered sufficiently to bring the indenter into engagement with the specimen. The motion of the crank 71 continues until the parts of the mechanism are brought into the position shown in Fig. 1, and the device is ready for another test cycle.

Because the interval during which the load is applied to the specimen is, for a given speed of descent of the weight 61, dependent upon the relative positions of the element 68 and the end 59 of the screw 58, the interval of load application can be varied by adjusting the position of screw 58. Also, the speed of descent of the indenter can be varied by adjustment of the needle valve at 65. Changing the speed of descent by adjustment of the needle valve of course changes the length of application of the load, but if the screw 58 is adjusted after such change of speed, the period of load application can be restored. Thus it can be seen that any combination of period of full load application and speed of approach of the indenter, within the range of the instrument, can be obtained by these two adjustments.

I claim:

1. In a hardness tester, a fixed frame having a support for a specimen, an indenter, means mounting said indenter for movement relative to said frame, said indenter and mounting means being weighted to urge the indenter into the surface of a specimen on said support with a predetermined force, lever means pivotally mounted on said frame, means connected to the lever means for pivoting said lever means at a predetermined speed in one direction, a projection on said lever means for operatively supporting said indenter and indenter mounting means against movement in a specimen engaging direction, said projection being mounted on said lever means in a position to move, during movement of the lever means in said one direction, in a direction to permit approach and engagement of the specimen by the indenter, and a second projection mounted on said lever means in a position to move during movement of the lever means in said one direction, to operatively engage said indenter and indenter mounting means subsequent to engagement of the specimen by the indenter and thus lift the indenter from the specimen.

2. In a hardness tester, a fixed frame having a support for a specimen, a beam pivotally mounted on said frame carrying an indenter on one arm and having its weight positioned to urge the indenter downwardly with a predetermined force, lever means pivotally mounted on said frame, means for pivoting said lever means at a predetermined speed in one direction, said lever means having a portion moving downwardly and a portion moving upwardly upon such pivoting movement of the lever means in said one direction, a projection on the first-mentioned portion of the lever means for operatively engaging the arm of the beam and supporting it against independent downward movement, and a projection on the second-mentioned portion of the lever means for operatively engaging the arm of the beam and raising it to lift the indenter from specimen engagement.

3. In a hardness tester, a fixed frame having a support for a specimen, an indenter, means mounting said indenter for downward movement to penetrate a specimen on said support, means weighting said indenter and indenter mounting means to urge the indenter downwardly, a first lever pivoted at one end to the frame and having a projection intermediate its ends operatively engageable with the indenter mounting means to restrain it from downward movement except upon downward movement of the opposite end of the lever, a second lever pivoted to the frame intermediate its ends, an abutment between the second mentioned end of the first lever and the adjacent end of the second lever limiting downward movement of the end of the first lever to that of the free end of the second lever, and a projection on the opposite end of the second lever operatively engageable with the indenter mounting means to raise it subsequent to penetration of the specimen.

References Cited in the file of this patent

UNITED STATES PATENTS

| 1,478,621 | Smith | Dec. 25, 1923 |
| 1,516,207 | Rockwell | Nov. 18, 1924 |
| 1,885,972 | Wilson | Nov. 1, 1932 |
| 2,420,654 | Cohen et al. | May 20, 1947 |

FOREIGN PATENTS

| 656,113 | Germany | Jan. 29, 1938 |
| 606,061 | Great Britain | Aug. 5, 1948 |